(12) United States Patent
Bass et al.

(10) Patent No.: US 8,585,207 B1
(45) Date of Patent: Nov. 19, 2013

(54) UP CONVERTERS AND GAAS BASED SEMICONDUCTOR LIGHT SOURCE SYSTEM FOR LARGE COLOR GAMUT DISPLAY AND PROJECTION DISPLAYS

(75) Inventors: Michael Bass, Indian River Shores, FL (US); Dennis G. Deppe, Oviedo, FL (US)

(73) Assignee: University of Central Florida Research Research Foundation, Inc., Orlando, FL (US)

(*) Notice: Subject to any disclaimer, the term of this patent is extended or adjusted under 35 U.S.C. 154(b) by 945 days.

(21) Appl. No.: 12/365,971

(22) Filed: Feb. 5, 2009

Related U.S. Application Data

(63) Continuation-in-part of application No. 12/349,712, filed on Jan. 7, 2009, and a continuation-in-part of application No. 12/124,234, filed on May 21, 2008, now Pat. No. 7,899,093, and a continuation-in-part of application No. 12/124,620, filed on May 21, 2008, now Pat. No. 7,804,640, and a continuation-in-part of application No. 11/758,435, filed on Jun. 5, 2007, now Pat. No. 7,471,706.

(60) Provisional application No. 61/026,827, filed on Feb. 7, 2008, provisional application No. 61/019,687, filed on Jan. 8, 2008, provisional application No. 60/939,924, filed on May 24, 2007, provisional application No. 60/939,956, filed on May 24, 2007, provisional application No. 60/811,969, filed on Jun. 7, 2006.

(51) Int. Cl.
*H01J 1/68* (2006.01)
*F21V 9/08* (2006.01)

(52) U.S. Cl.
USPC .................................. 353/31; 372/21; 257/80

(58) Field of Classification Search
USPC .................. 353/30, 31; 359/326; 372/21, 22; 257/80, 89
See application file for complete search history.

(56) References Cited

U.S. PATENT DOCUMENTS

| | | | |
|---|---|---|---|
| 5,089,860 A | 2/1992 | Deppe et al. |
| 5,184,114 A | 2/1993 | Brown |
| 5,684,621 A | 11/1997 | Downing |
| 5,764,403 A | 6/1998 | Downing |
| 5,914,807 A | 6/1999 | Downing |
| 5,943,160 A | 8/1999 | Downing |

(Continued)

*Primary Examiner* — Seung C Sohn
(74) *Attorney, Agent, or Firm* — Brian S. Steinberger; Phyllis K. Wood; Law Offices of Brian S. Steinberger, P.A.

(57) ABSTRACT

Method and system for an up conversion lighting system for use with displays. The system includes an up converter-semiconductor light source for emitting an up conversion emission and a spectrally selective optical element in the path of the emission for selectively passing selected wavelengths. The optical element has a coating selected to pass selected wavelengths. The up converter-semiconductor light source includes an up converter for emitting the up conversion emission, a semiconductor light source coupled with the up converter to excite an up conversion material within the up converter to emit an up conversion emission and a spatial light modulator for modulating the up conversion emission. For a full color display, the up converter includes a red, green and blue up converter and a separate a light source coupled with the red, green and blue up converters. The spectrally selectively optical element can be a spectrally selectively beam splitter having a film coating that is selected to transmit selected wavelengths.

19 Claims, 4 Drawing Sheets

(56) References Cited

U.S. PATENT DOCUMENTS

| | | |
|---|---|---|
| 5,956,172 A | 9/1999 | Downing |
| 6,028,977 A | 2/2000 | Newsome |
| 6,208,791 B1 | 3/2001 | Bischel et al. |
| 6,215,462 B1 | 4/2001 | Yamada et al. |
| 6,327,074 B1 | 12/2001 | Bass et al. |
| 6,501,590 B2 | 12/2002 | Bass et al. |
| 6,654,161 B2 | 11/2003 | Bass et al. |
| 6,795,455 B2 | 9/2004 | Scheps |
| 6,844,387 B2 | 1/2005 | Bass et al. |
| 6,897,999 B1 | 5/2005 | Bass et al. |
| 6,945,652 B2 * | 9/2005 | Sakata et al. ............ 353/30 |
| 6,986,581 B2 * | 1/2006 | Sun et al. ............ 353/31 |
| 7,213,923 B2 * | 5/2007 | Liu et al. ............ 353/31 |
| 7,471,706 B2 | 12/2008 | Bass et al. |

\* cited by examiner

UP CONVERTERS AND GAAS BASED SEMICONDUCTOR LIGHT SOURCE SYSTEM FOR LARGE COLOR GAMUT DISPLAY AND PROJECTION DISPLAYS

RELATED APPLICATIONS

This application is a continuation-in-part of U.S. application Ser. No. 12/349,712 filed on Jan. 7, 2009, U.S. application Ser. No. 12/124,234 filed on May 21, 2008, now U.S. Pat. No. 7,899,093, U.S. patent application Ser. Nos. 12/124,620 filed on May 21, 2008, now U.S. Pat. No. 7,804,640 and 11/758,435 filed on Jun. 5, 2007, now U.S. Pat. No. 7,471,706 issued on Dec. 30, 2008 which claim the benefit of priority to U.S. Provisional application Nos. 61/019,687 filed on Jan. 8, 2008, 60/939,924 filed on May 24, 2007, 60/939,956 filed on May 24, 2007 and 60/811,969 filed on Jun. 7, 2006, respectively, and claims the benefit of priority to U.S. Provisional Application No. 61/026,827 filed on Feb. 7, 2008.

GOVERNMENT LICENSE RIGHTS

This invention was made with Government support under Agency contract NSF Grant No. IIP-0637800 awarded by the National Sciences Foundation. The government has certain rights in this invention.

FIELD OF THE INVENTION

This invention relates to up-converters and, in particular, to methods and systems for a large color gamut display suitable for projection displays based on up converters and GaAs based semiconductor light sources.

BACKGROUND AND PRIOR ART

Two dimensional and three dimensional displays are well known to be made monochromatic displays. However, monochromatic does not offer the detail such as shown using red, green and blue colors. Displays using liquid crystals have been proposed of generating color displays. A problem with this type of prior art display is that they require arranging individual pixels in rows and corresponding columns. Another problem is that the devices described can be expensive and complicated to manufacture, can have a narrow angular view ranges with low brightness.

Several patents have been proposed for panel displays using two-frequency up conversion fluorescence. For example, U.S. Pat. Nos. 5,684,621; 5,764,403; 5,914,807; 5,943,160; and 5,956,172 all issued to Downing. The Downing '403 patent appears to be the most relevant to the subject invention. Downing '403 is primarily concerned with embodiments where the use different layers for red, green and blue emitters briefly describes some mixing in mixing of only crystal type materials in a single display media. However, for the single display media, Downing '403 uses nanometer sized particles which would inherently be difficult to form, handle and disperse in a display medium.

U.S. Pat. No. 6,327,074 titled "Display media using emitting particles dispersed in a transparent host" issued to M. Bass and H. Jenssen on Dec. 4, 2001 discloses two and three dimensional color image displays. The displays include a display medium having a substantially uniform dispersion of red, green and blue visible light emitting particles sized between approximately 0.5 to approximately 50 microns therethrough. The particles can be dye doped polymethylmethacrylate(pmma) plastic, and the display medium can be pmma, acrylic plastic or glass. Other particles can be used such as rare earth doped crystals. The two dimensional display uses three laser sources each having different wavelengths that direct light beams to each of three different types of particle in the display medium. Light is absorbed by the particles which then become excited and emit visible fluorescence. Modulators, scanners and lens can be used to move and focus the laser beams to different pixels in order to form the two dimensional images having different visible colors.

U.S. Pat. No. 6,501,590 titled "Display medium using emitting particles dispersed in a transparent host" issued to M. Bass and H. Jenssen on Dec. 31, 2002 describes another two and three dimensional color image display device. The displays include a display medium having a substantially uniform dispersion of red, green and blue visible light emitting particles sized between approximately 0.5 to approximately 50 microns therethrough. The particles can be dye doped polymethylmethacrylate(pmma) plastic, and the display medium can be pmma, acrylic plastic or glass. Other particles can be used such as rare earth doped crystals. The two dimensional display uses three laser sources each having different wavelengths that direct light beams to each of three different types of particle in the display medium. Light is absorbed by the particles which then become excited and emit visible fluorescence. Modulators, scanners and lens can be used to move and focus the laser beams to different pixels in order to form the two dimensional images having different visible colors.

Two and three dimensional display based on up conversion of near infrared light to the visible are described in U.S. Pat. No. 6,654,161 titled "Dispersed crystallite up-conversion displays" issued to M. Bass, H. Jenssen and Alexandra Rapaport issued on Nov. 25, 2003. The display medium is a transparent polymer containing particles of crystals doped with $Yb^{3+}$ and other rare earth ions. The $Yb^{3+}$ ions absorb light from a commercially available diode laser emitting near 975 nm and transfer that energy to the other dopant ions. Using a fluoride crystal host, $NaYF_4$, co-doped with $Tm^{3+}$ ions we obtain blue light at about 480 nm, with $Ho^{3+}$ or $Er^{3+}$ ions we obtain green light at about 550 nm and with $Er^{3+}$ we obtain red light at about 660 nm. The display medium is also used with a preferred component layout with experimentation test data, along with applications for full color, high brightness, high resolution, displays.

The doping of heavy metal luminophores in commercially available optical grade plastics, such as poly (methyl methacrylate) or polystyrene, generally results in the aggregation of the metal salt. This aggregation leads to excessive light scattering, weakening of the plastic's mechanical strength, and an inhomogenous composite that would be unsuitable for optical or display applications. U.S. Pat. No. 6,844,387 titled "Composites of inorganic luminophores stabilized in polymer hosts" issued to M. Bass and K. Belfield issued on Jan. 18, 2005 discloses a two and three dimensional display medium having a novel transparent polymer composite containing particles of crystals doped with $Yb^{3+}$ and other rare earth ions. The polymer composite creates homogeneously dispersed compositions without cracking or delamination of the film and can be used for various optical applications.

U.S. Pat. No. 6,897,999 titled "Optically Written Display" issued to Jason Eichenholz, M. Bass and Alexandra Rapaport issued on May 25, 2005 discloses another two, three dimensional color displays having uniform dispersion of red, green and blue visible light emitting micron particles. Pumping at approximately 976 nm can generate green and red colors having an approximately 4% limit efficiency. Modulators, scanners and lens can move and focus laser beams to different pixels forming two dimensional color images. Displays can be formed from near infrared source beams that are simultaneously split and modulated with micro electro mechanical systems, spatial light modulators, liquid crystal displays, digital micromirrors, digital light projectors, grating light valves, liquid crystal silicon devices, polysilicon LCDs, electron beam written SLMs, and electrically switchable bragg gratings. Pixels containing: Yb,Tm:YLF can emit blue light, Yb,Er(NYF) can emit green light, and Yb,Er:KYF and Yb,Ef:YF.sub.3 can emit red light.

U.S. Pat. No. 5,089,860 issued to D. G. Deppe and T. J. Rogers and titled "Quantum Well Device With Control of Spontaneous Photon Emission, and Method of Manufacturing Same," on 18 Feb. 1992 describes spontaneous photon emission intensity in a semiconductor quantum well that is strongly influenced by a highly reflecting interface, with the quantum well to interface spacing being less than the optical emission wavelength of the quantum well. An enhancement/inhibition ratio on the order of 10 is possible according to the present invention using a single reflector, and enhancement/inhibition ratios on the order of 1000 are possible when two reflectors are used in the quantum well light-emitting diode structures. In addition, according to the present invention, the gain, directionality, and efficiency of a vertical cavity surface-emitting laser can also be greatly improved. The patent includes a method of making the spontaneous photon emission intensity in a semiconductor quantum well.

A recent patent related to the subject matter of the present invention issued on Dec. 30, 2008 to the same assignee as the subject application and having a common inventor with the subject application is U.S. Pat. No. 7,471,706. The patent discloses a light emitting device that includes a substrate, at least one semiconductor light emitting device formed in or on the substrate, and up converting material disposed in or on the substrate. The up converting material is disposed in a path of light processed or emitted by the semiconductor device. The up converting material absorbs light emitted by the semiconductor device and emits up converted light in response. Integrated pixelated displays include a plurality of pixels formed on a surface of the substrate, with each pixel including up-conversion material based red light source, a blue light source a green light source, and a structure for selectively controlling emission from the red, blue and green lights sources for each of the pixels.

The methods and systems of the present invention provides a system using up converters in combinations with semiconductor light sources capable of producing the red, green and blue light needed to make a full color display with an extremely large color gamut. However, the efficient red emitter, 1% Er, 18% $Yb:YF_3$, emits some green light simultaneously with the red light making it appear yellow to the eye. The efficient green emitter, 1% Er, 18% Yb:NaYF, emits some red light while simultaneously emitting green though the eye is so sensitive to green that the red is only seen at the edges of the green up converting emitter. The efficient blue emitter, 0.4% Tm, 20% $Yb:KY_3F_{10}$, emits some red light when it emits blue and thus looks purple to the eye. The problem of multiple colors of emission that applies to the specified up converters, also exists for other up converters.

What is needed overcome the problem with prior art up conversion display systems is a solution based on properly designed optical thin film coatings that enables color separation to produce only the selected red, green and blue wavelength light from the up converters to be delivered by the display.

SUMMARY OF THE INVENTION

A primary objective of the invention is to provide methods, apparatus and systems for full color displays using up converters by removing unwanted colors from the up converter emissions through use of properly designed thin film coatings on beam combining optical components.

A second objective of the invention is to provide methods and systems based on properly designed optical thin film coatings for selectively transmitting selected red, green and blue wavelengths while reflecting unwanted red, green and blue wavelengths.

A third objective of the invention is to provide methods, apparatus and systems for full color displays using an up converter system suitable for projection displays and can be used with up converter-semiconductor light source array emissive screens or with LCD or other spatial light modulators where the up converter-semiconductor light sources would serve as sources to illuminate the non emissive spatial light modulator.

A fourth objective of the invention is to provide methods, apparatus and systems for full color displays using an up converter system for applications including front and rear projection displays, portable projection displays, head mounted displays. In a preferred embodiment the up conversion lighting system for a display includes an up converter-semiconductor light source for emitting an up conversion emission and a spectrally selective optical element in the path of the up conversion emission for selectively passing selected wavelengths of the up conversion emission and dumping unwanted wavelengths, the optical element having a film coating selected to pass selected up conversion emission wavelength. The up converter-semiconductor light source includes an up converter for emitting an up conversion emission, an up converter semiconductor light source coupled with the up converter to excite an up conversion material within the up converter to emit an up conversion emission and a spatial light modulator for modulating the up conversion emission.

For a fully color display, the up conversion lighting system includes a red up converter for emitting a bandwidth of red emission wavelengths, a green up converter for emitting a bandwidth of green emission wavelengths and a blue up converter semiconductor light source for emitting a bandwidth of blue emission wavelengths. In the full color embodiment, the up converter semiconductor light source includes a separate up converter semiconductor light source coupled with the red, green and blue up converters, respectively, for selectively exciting a corresponding one or more of the red, green and blue up conversion materials to emit the selected red, green and blue up conversion emission.

The spectrally selectively optical element can be a spectrally selectively beam splitter having a film coating that is selected to transmit selected wavelengths of the red, green and blue up conversion emission and dumping unwanted red and green wavelengths. For example, the first spectrally selective beam splitter has a first film coating for reflecting one of the selected red wavelength emitted by the red up converter semiconductor light source and the green selected wavelength emitted by the green up converter semiconductor light source while transmitting an opposite one of the selected red wavelength and green wavelength while simultaneously dumping unwanted red and green wavelengths emitted by the corresponding one of the red and green up converter semiconductor light source and the second spectrally selective beam splitter has a film coating for reflecting the selected blue wavelength emitted by the blue up converter semiconductor light source while transmitting the selected red and green wavelengths reflected by or transmitted through the first optical element and simultaneously dumping unwanted red wavelengths emitted by the blue up converter semiconductor light source.

Depending on the application for the up conversion lighting system, the spatial light modulator can be a liquid crystal spatial light modulator, a digital light processor, a transmissive spatial light modulator or reflective spatial light modulator. The reflective spatial light modulator can be liquid crystals on silicon where the up conversion light source is located on a side of the liquid crystals on silicon spatial light modulator. Alternatively, the up converter semiconductor light source is positioned to flood light onto the liquid crystal on silicon spatial light modulator from a front side since the liquid crystal on silicon spatial light modulator is a reflective display.

In an embodiment, the up conversion lighting system is used for applications including projection display screens. In this embodiment, the system can include a projection lens in the path of the selected wavelength output from the beam splitter to deliver the selected up converted emission to a projection display screen such as a portable projector and a head mounted display systems, front projection onto a theater screen, a video system having rear projection onto the video system screen or a video system having rear projection onto a computer monitor.

Further objects and advantages of this invention will be apparent from the following detailed description of preferred embodiments which are illustrated schematically in the accompanying drawings.

DESCRIPTION OF THE PREFERRED EMBODIMENTS

Figure 1:
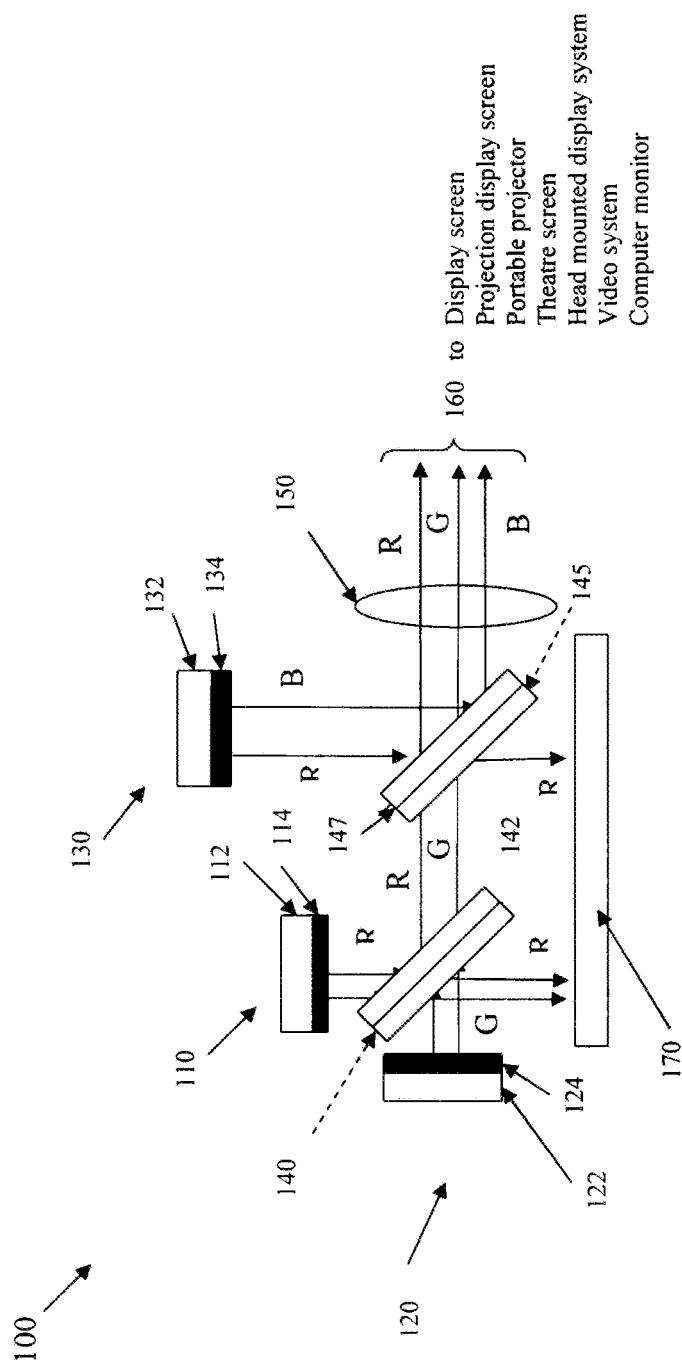
FIG. 1 is a block diagram showing the optical arrangement of components in the full color display using red, green and blue up converter-semiconductor light source displays.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | |
|---|---|
| 100 | display system |
| 110 | red display screen |
| 112 | semiconductor light source |
| 114 | red up converter |
| 120 | green display screen |
| 122 | semiconductor light source |
| 124 | green up converter |
| 130 | blue display screen |
| 132 | semiconductor light source |
| 134 | blue up converter |
| 140 | beamsplitter |
| 142 | thin film |
| 145 | beamsplitter |
| 147 | thin film |
| 150 | lens |
| 160 | output |
| 170 | waste light collector |
| 400 | projection system |
| 410 | red display screen |
| 415 | red modulator |
| 420 | green display screen |
| 425 | green modulator |
| 430 | blue display screen |
| 435 | blue modulator |
| 440 | beamsplitter |
| 445 | beamsplitter |
| 450 | lens |
| 460 | output |
| 470 | waste light collector |

Up converters in combinations with semiconductor light sources capable of producing the red, green and blue light needed to make a full color display with an extremely large color gamut have a problem of multiple colors of emission from each up converter. For example, the efficient red emitter, 1% Er, 18% Yb:YF$_3$, emits some green light simultaneously with the red light making it appear yellow to the eye. The efficient green emitter, 1% Er, 18% Yb:NaYF, emits some red light while simultaneously emitting green though the eye is so sensitive to green that the red is only seen at the edges of the green up converting emitter. The efficient blue emitter, 0.4% Tm, 20% Yb:KY$_3$F$_{10}$, emits some red light when it emits blue and thus looks purple to the eye. Though the problem of multiple colors of emission is described for the specified up converters, the problem also exists for other up converters. The methods and systems of the present invention overcome the problem with a solution based on properly designed optical thin film coatings for selectively transmitting selected red, green and blue wavelengths while reflecting unwanted red, green and blue wavelengths.

FIG. 1 shows the configuration of one red 110, one green 120 and one blue display screen 130, each including up converters 112, 122, and 132 coupled with an array of semiconductor light sources 114, 124, 134, combined with beam splitters 140 and 145 coated with thin film 142 and 147 to produce an output 160 containing only the pure red, pure green and pure blue light selected for the particular application. This is accomplished by preparing the thin film 142 coatings for 45 degree incidence angle so that the beam splitter film 140 reflects the red light of selected wavelengths emitted by the red up converter display 110 on the upper left and transmits the green light of selected wavelengths emitted by the green up converter display 120. The second thin film coating 147 is prepared so that it reflects the blue light of selected wavelengths emitted by the blue up converter display 130 and transmits the red and green light traveling to the right from the first beam splitter 140. The 45 degree angle for the thin film coating in FIG. 1 is shown for purpose of illustration and discussion, and not a limitation. Those skilled in the art will understand that an alternative angle may be substituted for each thin film for alternative applications. The display system 100 also includes a waste light collector 170 for collecting the red, green and blue light wavelengths that are outside the bandwidth of the selected wavelengths.

The red 110, green 120 and blue 130 displays are up converter-semiconductor light source displays. The semiconductor light source is coupled with the up converter for emitting a light to excite the up converter to emit a corresponding up converted emission. The semiconductor light source can include an array of semiconductor light sources for exciting the up converters or can include a separate semiconductor light source for each up converter display for exciting each of the red, green and blue up converts to emit red, green and blue emissions for each pixel.

The lens 150 shown in FIG. 1 is an achromatic lens that images all three color images from the three up converter displays 110, 120 and 130. Since the optical path length from each display to the lens 150 is the same, this lens 150 projects all three images onto a screen (not shown) to form a full color image. In an embodiment, the lens 150 is a projection lens and in an alternative embodiment, the lens can be a zoom projection lens when required. This combination of up conversion displays 110, 120 and 130, beam splitters 140 and 145 and projection lens 150 form a projection display 100 capable of front projection onto a screen as in a theater or home theater or capable of rear projection onto the screen of a video system or a computer monitor. Other applications for projection system include portable projectors and head mounted display systems.

Figure 4:
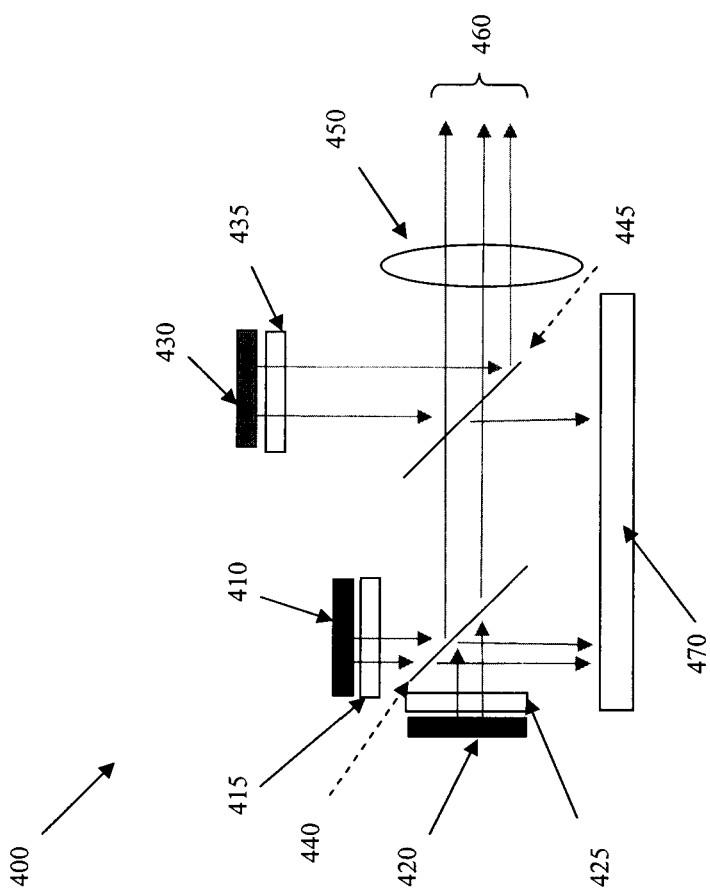
FIG. 4 is a schematic block diagram showing up converter semiconductor light source combinations used as red, green and blue light sources for spatial light modulators for projection displays according to the present invention.

The optical component combination shown in FIG. 1 can be modified as shown in FIG. 4 where the up conversion-semiconductor light displays 410, 420 and 430 are used as light sources for liquid crystal spatial light modulators 415, 425 and 435. The spatial light modulators modulate the up converted light. The image information for each color is presented in the liquid crystal spatial light modulators 415, 425 and 435 with each being illuminated by the corresponding color up conversion light source 410, 420 and 430. This combination of up converters with semiconductor light sources provide wide color gamut red, green and blue light for spatial light modulators such as liquid crystal or digital light processors (DLP) with spectrally selective beam splitters 440 and 445 with specially designed optical thin film coatings, and projection lens 450 can be the display source for a projection display.

The optical configuration of the light source and spatial light modulator differs for each type of spatial light modulator. The example shown in FIG. 4 is useful for a transmissive spatial light modulator such as a transmissive liquid crystal spatial light modulator. For reflective spatial light modulators such as liquid crystal on silicon (LCOS) the up conversion light sources can be on the sides of a diffuser used to deliver light to a liquid crystal on silicon spatial light modulator or could be positioned to flood light onto the liquid crystal on silicon spatial light modulator from the front. This example is for purpose of discussion and illustration and not a limitation. Those skilled in the art will understand that alternative configurations and applications are available.

The up converting materials can be selected from materials which emit red, green, and blue visible light. For display applications the respective up converter material (red, green and blue emitting) are spatially separated from one another and are generally excited by their own light sources. Each display pixel thus generally has three associated semiconductor light emitting devices, with one light emitting device coupled to the red up converting material, one light emitting device coupled to the green up converting material and one blue light emitting device coupled to the blue up converting material. When more than one emitter in a pixel is excited, a human observer will see a color other than red, green or blue, but rather a color that lies within the color gamut defined by the combination of wavelengths emitted. A pixel thus can generate any color by emitting the desired mixture of red green and/or blue so long as that color lies within the color gamut. Separate emitters can be independently accessed and made to emit independently using well known addressing techniques. Independent emission of the red, green, and blue light emitters can be used to fabricate a full color display.

Combinations of color emitters to generate white light sources, or single color sources are also possible. For such applications the emitters can be combined in layered or mixed combinations to be jointly excited by a single semiconductor light source. These combinations can be useful for illumination using the white light source, or for signaling or other applications using individual colors or combined colors of fixed spectral content.

As known in the art, the pixel emission can be controlled by addressing the semiconductor light source with its own electrodes, or with an array of electrodes to form matrix addressing. The matrix addressing can be active or passive.

Figure 2:
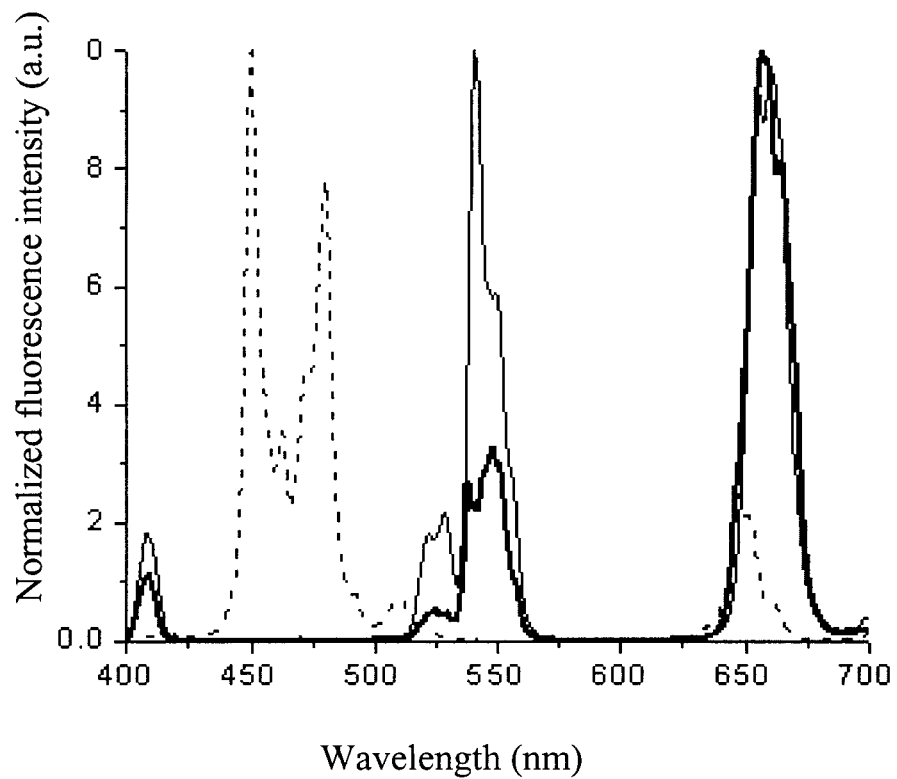
FIG. 2 shows the emission spectra of the green, red and blue emitters operating at maximum efficiency and each has been normalized to its highest peak.

FIG. 2 shows the emission spectra of the green, red and blue emitters operating at maximum efficiency and each has been normalized to its highest peak. As shown in FIG. 4 in conjunction with FIG. 2, the green to be rejected from the red emitter 410 being at the same wavelength as the green from the green emitter is transmitted to the beam dump 170, 470 while the desired green from the green emitter 420 is transmitted. The red from the green emitter 420 is reflected to the beam dump 470 since it is the same wavelength as the selected red from the red emitter 410. The red from the blue emitter 430 is at about the same wavelength as the selected red from the red emitter 410 and so it is transmitted to the beam dump 470 while the blue is reflected towards the projection lens 460. While providing separate red, green, and blue emitters, the up-converters can also be combined to produce white light. In particular, the blue and red emitters are complementary colors since the red emitter also emits a small amount of green light. When these two are combined, a white light source is produced.

In this manner the green light emitted by the red up conversion display 410 is transmitted by the beam splitter 440 to the waste light absorber 470 or beam dump where it is absorbed or dumped out of the system and the red light emitted by the green up conversion display 420 is reflected into this same beam dump 470. Thus, traveling to the right of the first beam splitter 440 is the selected red and green light from the red and green up conversion-semiconductor light source displays 410 and 420.

The second beam splitter 445, on the right side in FIG. 4, is designed to reflect the selected blue light and transmit the selected red and green light. This beam splitter 445 does not affect the passage of the selected red and green light except to shift the light slightly upward in FIG. 4 while allowing the red light from the blue up conversion display 430 to pass through to the beam dump 470. The result is that only the selected red, green and blue light is traveling out of the combination of up converting displays and beam splitters to the right.

For example, the efficient red emitter, 1% Er, 18% Yb:YF$_3$, emits some green light simultaneously with the red light making it appear yellow to the eye. The efficient green emitter, 1% Er, 18% Yb:NaYF, emits some red light while simultaneously emitting green though the eye is so sensitive to green that the red is only seen at the edges of the green up converting emitter. The efficient blue emitter, 0.4% Tm, 20% Yb:KY$_3$F$_{10}$, emits some red light when it emits blue and thus looks purple to the eye. The methods and systems of the present invention overcome the problem with a solution as shown in FIG. 1 and FIG. 4 based on properly designed optical thin film coatings on the beam splitters for selectively transmitting selected red, green and blue wavelengths while reflecting unwanted red, green and blue wavelengths.

Figure 3:
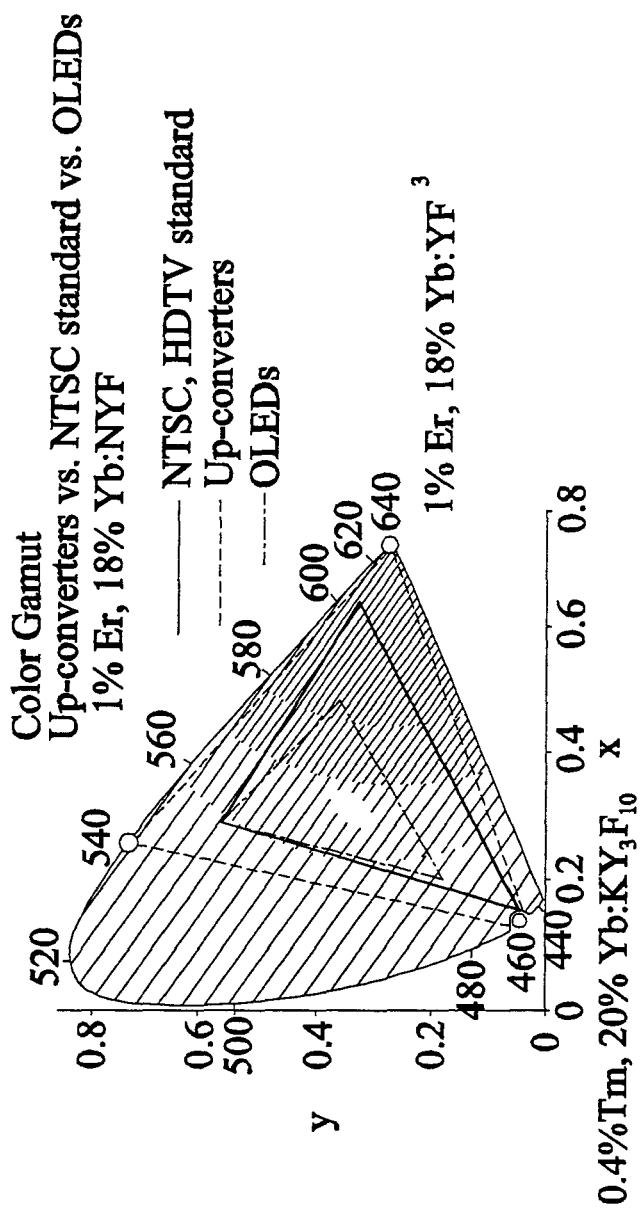
FIG. 3 shows color gamuts of solid-state up-converters plotted with NTSC/HDTV standard and OLED display from one of the leading manufacturers specializing in headset products.

FIG. 3 shows the color gamuts of solid-state up-converters plotted with NTSC/HDTV standard and organic light emitting diode OLED display from one of the leading manufacturers specializing in headset products. The up converters, based on rare earth doped fluorides, emit at the points on the diagram boundary and so result in one of very few sets of light sources that can reach or exceed the NTSC color standard. This establishes the up-converter resonant cavity light emitting diode (UC-RCLED) display's ability to fully reproduce nearly the entire real life color spectrum as sensed by the human eye. The color spectrum is defined by the nearly pure colors of red, green and blue and is represented by the points indicated on the boundaries of the CIE color diagram in FIG. 3 for the materials indicated.

As described in U.S. Pat. No. 7,471,706, issued on Dec. 30, 2008 to the same assignee as the subject application and having a common inventor with the subject application which is incorporated by reference. In this embodiment, the up converting material is in optical communication with light emanating from the semiconductor light emitting surface. For example, the up conversion material can be in a resonant cavity formed in the substrate spaced apart from the light emitting device. Arrays of semiconductor light sources with appropriate up converters according to the present invention can be used to fabricate high resolution displays having hundreds or many thousands of pixels. In some embodiments the semiconductor light sources are RCLEDs. To form full color displays, pixels containing one red, one green and one blue emitting combination of up converting particles and semiconductor light sources are provided. Monochromatic displays of any color are also possible by selecting any one of the primary (RGB) up converters or by combining them to achieve another desired color. White light can be generated by selecting appropriate combinations of two or three or more emitters.

The up converting materials can be selected from materials which emit red, green, and blue visible light. For display applications the respective up converter material (red, green and blue emitting) are spatially separated from one another and are generally excited by their own light sources. Each display pixel thus generally has three associated semiconductor light emitting devices as shown in FIG. 1b, with one light emitting device coupled to the red up converting material, one light emitting device coupled to the green up converting material and one blue light emitting device coupled to the blue up converting material. When more than one emitter in a pixel is excited, a human observer will see a color other than red, green or blue, but rather a color that lies within the color gamut defined by the combination of wavelengths emitted. A pixel thus can generate any color by emitting the desired mixture of red green and/or blue so long as that color lies within the color gamut. Separate emitters can be independently accessed and made to emit independently using well known addressing techniques. Independent emission of the red, green, and blue light emitters can be used to fabricate a full color display.

Combinations of color emitters to generate white light sources, or single color sources are also possible. For such applications the emitters can be combined in layered or mixed combinations to be jointly excited by a single semiconductor light source. These combinations can be useful for illumination using the white light source, or for signaling or other applications using individual colors or combined colors of fixed spectral content.

Important properties of the up-conversion materials, including the efficiency temperature dependence and the critical role of scattering of the pump light in powder-binder combination are required as described in co-pending U.S. application Ser. No. 12/124,234. When these properties are accounted for, approximately 1% Er, 18% Yb:YF3 are found to be an efficient red light emitter with photometric efficiency of approximately 5 lm/W, approximately 1% Er, 18% Yb:NaYF4 produces green light with photometric efficiency of approximately 52 lm/W and approximately 0.4% Tm, 20% Yb:KY3F10 emits blue light with photometric efficiency of approximately 4.2 lm/W. These particular materials are not only the most efficient found so far, their efficient excitation the same type of light sources at approximately 975 nm enables dense integration for high-resolution display chips. In addition, the color gamut is significantly larger than that used in conventional television displays since the red, green and blue colors are highly saturated and quite pure as shown in FIG. 3. The emission lifetimes of the emitters are all approximately 1 msec. Since their efficiencies nearly peak at eight relatively low approximately 975 nm intensities, they are in fact ideally matched to the intensity levels achieved in approximately 975 nm RCLEDs.

As known in the art, the pixel emission can be controlled by addressing the semiconductor light source with its own electrodes, or with an array of electrodes to form matrix addressing. The matrix addressing can be active or passive. For example, using two-dimensional active matrix addressing, a row of semiconductor light emitters may be simultaneously gated by applying a given voltage, while additional voltage is applied to column electrodes. The column electrode voltages may contain display data in their specific voltage values, and this data can be transferred to the semiconductor light emitter, which in turn excites the up converting material. By choosing an electro-optical response of the semiconductor light source that is faster than the optical response of the up converting material, visible luminescence can be maintained in the up converting material after the semiconductor light source is turned off. In this manner display data can be individually sent to a large number of pixels using a much smaller number of electrodes. Passive matrix addressing can also be achieved using similar optical responses between the semiconductor light source and up converting materials.

In summary, the optical system of the present invention enables full color displays using up converters by removing unwanted color wavelengths from the up converter emission through use of properly designed thin film coatings on beam combing optical components.

In a preferred embodiment the up conversion lighting system for a display includes an up converter-semiconductor light source for emitting an up conversion emission and a spectrally selective optical element in the path of the up conversion emission for selectively passing selected wavelengths of the up conversion emission and dumping unwanted wavelengths, the optical element having a film coating selected to pass selected up conversion emission wavelength. The up converter-semiconductor light source includes an up converter for emitting an up conversion emission, an up converter semiconductor light source coupled with the up converter to excite an up conversion material within the up converter to emit an up conversion emission and a spatial light modulator for modulating the up conversion emission.

For a fully color display, the up conversion lighting system includes a red up converter for emitting a bandwidth of red emission wavelengths, a green up converter for emitting a bandwidth of green emission wavelengths and a blue up converter semiconductor light source for emitting a bandwidth of blue emission wavelengths. In the full color embodiment, the up converter semiconductor light source includes a separate up converter semiconductor light source coupled with the red, green and blue up converters, respectively, for selectively exciting a corresponding one or more of the red, green and blue up conversion materials to emit the selected red, green and blue up conversion emission.

The spectrally selectively optical element can be a spectrally selectively beam splitter having a film coating that is selected to transmit selected wavelengths of the red, green and blue up conversion emission and dumping unwanted red and green wavelengths. For example, the first spectrally selective beam splitter has a first film coating for reflecting one of the selected red wavelength emitted by the red up converter semiconductor light source and the green selected wavelength emitted by the green up converter semiconductor light source while transmitting an opposite one of the selected red wavelength and green wavelength while simultaneously dumping unwanted red and green wavelengths emitted by the corresponding one of the red and green up converter semiconductor light source and the second spectrally selective beam splitter has a film coating for reflecting the selected blue wavelength emitted by the blue up converter semiconductor light source while transmitting the selected red and green wavelengths reflected by or transmitted through the first optical element and simultaneously dumping unwanted red wavelengths emitted by the blue up converter semiconductor light source.

Depending on the application for the up conversion lighting system, the spatial light modulator can be a liquid crystal spatial light modulator, a digital light processor, a transmissive spatial light modulator or reflective spatial light modulator. The reflective spatial light modulator can be liquid crystals on silicon where the up conversion light source is located on a side of the liquid crystals on silicon spatial light modulator. Alternatively, the up converter semiconductor light source is positioned to flood light onto the liquid crystal on silicon spatial light modulator from a front side since the liquid crystal on silicon spatial light modulator is a reflective display.

In an embodiment, the up conversion lighting system is used for applications including projection display screens. In this embodiment, the system can include a projection lens in the path of the selected wavelength output from the beam splitter to deliver the selected up converted emission to a projection display screen such as a portable projector and a head mounted display systems, front projection onto a theater screen, a video system having rear projection onto the video system screen or a video system having rear projection onto a computer monitor.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An up conversion lighting system for a display comprising:
    a semiconductor light source for producing an excitation light beam;
    a red, a green and a blue up converter for selectively emitting a corresponding bandwidth of red, green and blue up conversion emission wavelengths, respectively, and an unwanted green or red emission wavelength simultaneously when selectively induced by the excitation light beam; and
    a first and second spectrally selective optical element in the path of the up conversion emission, the first spectrally selective optical element selectively passing green wavelength emission while reflecting red wavelength emission and the second spectrally selective optical element passing red wavelength emission and reflecting blue wavelengths of the up conversion emission and dumping unwanted green and red wavelengths.

2. The up conversion lighting system of claim 1, further comprising:
    a spatial light modulator for modulating the up conversion emission.

3. The up conversion lighting system of claim 2, further comprising:
    a projection lens in the path of the selected wavelength output from the first and second spectrally selective optical element to deliver the selected up converted emission to a projection display screen.

4. The up conversion lighting system of claim 3 wherein the projection display screen includes a portable projector and a head mounted display systems.

5. The up conversion lighting system of claim 3 wherein the projection display screen is front projection onto a theater screen.

6. The up conversion lighting system of claim 3 wherein the projection display screen is a video system having rear projection onto a video system screen.

7. The up conversion lighting system of claim 3 wherein the projection display screen is a video system having rear projection onto a computer monitor.

8. The up conversion lighting system of claim 2, wherein the semiconductor light source is an array of semiconductor light sources.

9. The up conversion lighting system of claim 2, wherein the spatial light modulator is a liquid crystal spatial light modulator.

10. The up conversion lighting system of claim 2, wherein the spatial light modulator is a digital light processor.

11. The up conversion lighting system of claim 2, wherein the spatial light modulator is a transmissive spatial light modulator.

12. The up conversion lighting system of claim 2, wherein the spatial light modulator is a reflective spatial light modulator.

13. The up conversion lighting system of claim 12, wherein the reflective spatial light modulator is a liquid crystals on silicon.

14. The up conversion lighting system of claim 1 wherein the semiconductor light source comprises:
    a first, second and third up converter semiconductor light source coupled with the red, green and blue up converters, respectively, for selectively exciting a corresponding one or more of the red, green and blue up conversion materials to emit the selected red, green and blue up conversion emission.

15. The up conversion lighting system of claim 1 wherein the semiconductor light source comprises:
    a red up converter coupled with a first semiconductor light source for emitting a bandwidth of red emission wavelengths and an unwanted green emission wavelength simultaneously with the red emission;

a green up converter coupled with a second semiconductor light source for emitting a bandwidth of green emission wavelengths and an unwanted red emission wavelength simultaneously with the green emission; and a blue up converter coupled with a third semiconductor light source for emitting a bandwidth of blue emission wavelengths and an unwanted red emission wavelength simultaneously with the blue emission.

16. The up conversion lighting system of claim 1 wherein the first and second spectrally selective optical element comprises:

a first spectrally selective beam splitter having a first thin film coating for reflecting red wavelength emitted by the red up converter and the green up converter while transmitting green wavelength to simultaneously dumping unwanted red and green wavelengths; and a second spectrally selective beam splitter having a second thin film coating for reflecting the selected blue wavelength emitted by the blue up converter semiconductor light source while transmitting the unwanted red wavelengths transmitted through the second optical element and simultaneously dump the unwanted red wavelengths emitted by the blue up converter.

17. The up conversion lighting system of claim 16, further comprising:

a projection lens in the path of the selected red, green and blue wavelength output from the second optical element to deliver the selected up converted emissions to a projection display screen.

18. A method for up conversion lighting for a display comprising the steps of:

providing a red up converter and corresponding semiconductor light source for emitting a bandwidth of red emission wavelengths and an unwanted green emission wavelength simultaneously with the red emission;

providing a green up converter and corresponding semiconductor light source for emitting a bandwidth of green emission wavelengths and an unwanted red emission wavelength simultaneously with the green emission; and providing a blue up converter and corresponding semiconductor light source for emitting a bandwidth of blue emission wavelengths and an unwanted red emission wavelength simultaneously with the blue emission; and placing a first optical element in the path of the red and the green up conversion emission for selectively passing green emission and reflecting red emission; and a second optical element in a path of the blue up converter to reflect the blue wavelengths of the blue up conversion emission and transmitting the unwanted red emission wavelengths, the first and second optical element each having a thin film coating selected to dump the unwanted red emission from the green and blue up converters and the unwanted green emission from the red up converter.

19. The method of claim 18, further comprising the step of:

providing a projection lens in the path of the selected wavelength output from the first and second spectrally selective optical element to deliver the selected up converted emission to a projection display screen.

* * * * *